(12) United States Patent
Fridén et al.

(10) Patent No.: US 11,240,768 B2
(45) Date of Patent: Feb. 1, 2022

(54) METHOD OF CONTROLLING MAXIMUM OUTPUT POWER OF A TRANSMITTER OF AN UNMANNED AERIAL VEHICLE

(71) Applicant: Telefonaktiebolaget LM Ericsson (publ), Stockholm (SE)

(72) Inventors: Jonas Fridén, Mölndal (SE); Fredrik Harrysson, Gothenburg (SE); Lars Manholm, Gothenburg (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/620,290

(22) PCT Filed: Jun. 9, 2017

(86) PCT No.: PCT/EP2017/064148
§ 371 (c)(1),
(2) Date: Dec. 6, 2019

(87) PCT Pub. No.: WO2018/224168
PCT Pub. Date: Dec. 13, 2018

(65) Prior Publication Data
US 2020/0213956 A1    Jul. 2, 2020

(51) Int. Cl.
*H04W 52/04* (2009.01)
*H04W 52/36* (2009.01)
*H04B 7/185* (2006.01)
*H04W 52/28* (2009.01)

(52) U.S. Cl.
CPC ...... *H04W 52/367* (2013.01); *H04B 7/18504* (2013.01); *H04B 7/18506* (2013.01); *H04W 52/283* (2013.01)

(58) Field of Classification Search
CPC .... H04W 52/367; H04W 52/04; H04W 52/18
See application file for complete search history.

(56) References Cited

U.S. PATENT DOCUMENTS

| 2009/0170545 | A1* | 7/2009 | Choi | H04W 52/244 |
| | | | | 455/513 |
| 2014/0364053 | A1 | 12/2014 | Schirrmacher | |
| 2018/0152909 | A1* | 5/2018 | Hanes | G01S 5/0252 |

(Continued)

OTHER PUBLICATIONS

International Search Report and Written Opinion dated Feb. 8, 2018 issued in International Patent Application No. PCT/EP2017/064148. (9 pages).

(Continued)

*Primary Examiner* — Tu X Nguyen
(74) *Attorney, Agent, or Firm* — Rothwell, Figg, Ernst & Manbeck, P.C.

(57) ABSTRACT

A method (10) of controlling maximum output power of a transmitter (23) of an unmanned aerial vehicle (2) is disclosed. The method (10) is performed by the unmanned aerial vehicle (2) and comprises obtaining (11) information about its height h over ground, and adapting (12) maximum allowed output power based on the obtained information about the height h over ground. A corresponding method in a network node, an unmanned aerial vehicle, a network node, computer programs and computer program products are also disclosed.

20 Claims, 2 Drawing Sheets

(56) References Cited

U.S. PATENT DOCUMENTS

2018/0277939 A1* 9/2018 Peitzer ............... H01Q 1/18
2018/0359710 A1* 12/2018 Desclos ............. H04W 52/42

OTHER PUBLICATIONS

Ericsson, "On potential enhancements for low altitude aerial vehicles", 3GPP TSG-RAN WG1 #89; R1-1708294; Hangzhou, China, May 15-19, 2017, XP051273487. (3 pages).

Mozaffari, M. et al., "Mobile Unmanned Aerial Vehicles (UAVs) for Energy-Efficient Internet of Things Communications", ARXIV.org, Cornell University, Ithaca, NY, Mar. 15, 2017, XP080757325. (33 pages).

Rupasinghe, N. et al., "Optimum Hovering Locations with Angular Domain User Separation for Cooperative UAV Networks", 2016 IEEE Global Communications Conference, IEEE, Dec. 4, 2016, XP033058836. (6 pages).

"Unmanned aerial vehicle," Wikipedia, The Free Encyclopedia, https://web.archive.org/web/20170520003559/https://en.wikipedia.org/wiki/Unmanned_aerial_vehicle, May 20, 2017. (40 pages).

"Small Unmanned Aerial Systems Market Exceeds US$8.4 Billion by 2019, Dominated by the Commercial Sector and Driven by Commercial Applications," https://www.abiresearch.com/press/small-unmanned-arial-systems-market-exceeds-us84-b/, Jan. 5, 2015 (1 page).

\* cited by examiner

METHOD OF CONTROLLING MAXIMUM OUTPUT POWER OF A TRANSMITTER OF AN UNMANNED AERIAL VEHICLE

CROSS REFERENCE TO RELATED APPLICATION(S)

This application is a 35 U.S.C. § 371 National Stage of International Patent Application No. PCT/EP2017/064148, filed Jun. 9, 2017, designating the United States.

TECHNICAL FIELD

The technology disclosed herein relates generally to the field of wireless communication, and in particular to methods of controlling maximum output power of a transmitter of an unmanned aerial vehicle and corresponding method in a network node, an unmanned aerial vehicle, a network node, computer programs and computer program products.

BACKGROUND

Regulatory requirements on Electromagnetic fields (EMFs) can, for a specific antenna implementation, be translated to limits on the maximum allowed output power for radiating devices, such as, for instance, access nodes (e.g. base stations), user equipment (UE), etc., and it is expected that similar requirements are to apply also for unmanned aerial vehicles (UAV), also known as drones. Because UEs might be radiating in close vicinity of people, the EMF requirements are very strict for such devices and may be different in e.g. different geographical regions (maximum allowed output power may, for instance, be 23 dBm). Compliance with EMF requirements can for base stations be assured by deploying the equipment at a certain distance from people, hence base stations can be allowed to use larger output power. Since the drones move around, they might radiate close to people, which means that compliance to EMF requirements needs to be ensured also when these radiating devices are operated close to people.

It is expected that, for safety and performance reasons, future drones will be connected to wireless networks for example Long Term Evolution (LTE) and/or 5G. In order to fulfil the EMF requirements also when the drone is close to people, the maximum allowed output power for drones will be very low, most likely in the same order as for UEs. A difficulty may arise on how to communicate with the drones, e.g. how provide it with instructions on routes, in a reliable manner while also meeting the EMF requirements.

SUMMARY

An objective of the present disclosure is to address and improve various aspects for communication with unmanned aerial vehicles. A particular objective is to maintain reliable communication irrespective of altitude of the unmanned aerial vehicle, while still meeting the EMF requirements. Still another particular objective is to ensure that the unmanned aerial vehicle complies with the EMF requirements irrespective of its distance (vertically and laterally) to people. These objectives and others are achieved by the methods, devices, computer programs and computer program products according to the appended independent claims, and by the embodiments according to the dependent claims.

The objective is according to an aspect achieved by a method of controlling maximum output power of a transmitter of an unmanned aerial vehicle. The method is performed by the unmanned aerial vehicle and comprises obtaining information about its height h over ground, and adapting maximum allowed output power based on the obtained information about the height h over ground.

The problem of the output power being too low owing to EMF requirements is overcome. Irrespective of height, the unmanned aerial vehicle will have a reliable communication link to e.g. a base station, since the EMF requirements are adapted to the height at which the unmanned aerial vehicle flies. The method may easily be implemented in various types of unmanned aerial vehicles.

The objective is according to an aspect achieved by a computer program for an unmanned aerial vehicle. The computer program comprises computer program code, which, when run on at processing circuitry of the unmanned aerial vehicle causes the unmanned aerial vehicle to perform the method as above.

The objective is according to an aspect achieved by a computer program product comprising a computer program as above and a computer readable means on which the computer program is stored.

The objective is according to an aspect achieved by an unmanned aerial vehicle controlling maximum output power of a transmitter thereof. The unmanned aerial vehicle is configured to: obtain information about its height h over ground, and adapt maximum allowed output power based on the obtained information about the height h over ground.

The objective is according to an aspect achieved by a method of controlling maximum output power of an unmanned aerial vehicle. The is performed by a network node and comprises: obtaining information about height h over ground of the unmanned aerial vehicle, and instructing the unmanned aerial vehicle on maximum allowed output power based on the obtained information about the height h over ground.

The objective is according to an aspect achieved by a computer program for network node. The computer program comprises computer program code, which, when run on at processing circuitry of the network node causes the network node to perform the method as above.

The objective is according to an aspect achieved by a computer program product comprising a computer program as above and a computer readable means on which the computer program is stored.

The objective is according to an aspect achieved by a network node for controlling maximum output power of an unmanned aerial vehicle. The network node is configured to: obtain information about height h over ground of the unmanned aerial vehicle, and instruct the unmanned aerial vehicle on maximum allowed output power based on the obtained information about the height h over ground.

Further features and advantages of the embodiments of the present teachings will become clear upon reading the following description and the accompanying drawings.

DETAILED DESCRIPTION

Figure 1:
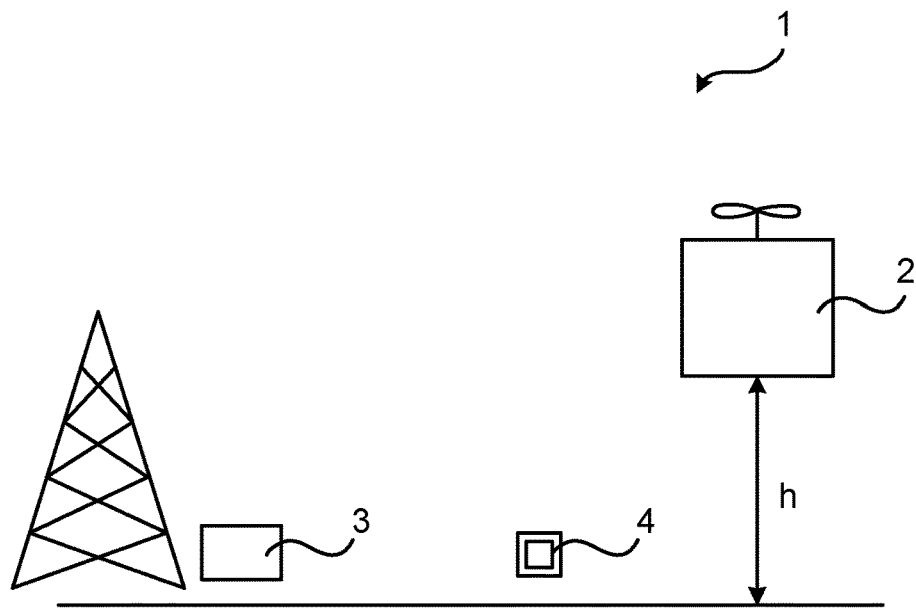
FIG. 1 illustrates schematically an environment in which embodiments in accordance with the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to ensure compliance with EMF requirements also when in close proximity to people, the maximum allowed output power for unmanned aerial vehicles (also denoted drones in the following) will need to be low, probably, as mentioned, in the same order as for UEs. Hence, drones may experience problems with coverage when flying high up in the air. That is, the maximum allowed output power may not be sufficient to establish a link to e.g. a base station.

Briefly, according to an aspect of the present teachings, the maximum output power for a drone is set based on its height over ground, basically such that the closer the drone is to the ground the lower the maximum output power becomes. This allows the drone to have higher maximum output power where there is no risk of people being exposed to too high EMF, thereby ensuring a reliable communication link to, for instance, a base station.

FIG. 1 illustrates schematically an environment in which embodiments in accordance with the present teachings may be implemented.

It is expected that drones 2, in the future, will be connected to a communications network 1 for safety and performance enhancements of the drone 2, such as remote control of the drone 2 over a large area, positioning and vehicle-to-vehicle (V2V) communication to mention a few examples. The communications network 1 may, for instance, be a Long Term Evolution (LTE) and/or 5G communications network. In deployments today, network nodes 3, in particular access nodes such as base stations 3, are mainly pointing their radiation patterns downwards by using mechanical and/or electrical tilt mechanisms for controlling antennas. This radiation strategy is used for enhancing the coverage for communication devices 4, e.g. user equipment (UEs), on the ground. This means that the coverage up in the air, particularly high up, will be very challenging for drones 2, especially for uplink signals (i.e. signals transmitted from the drones 2 to the network node 3) due to EMF requirements. The drone 2 has more limiting EMF requirements than the base station 3, since the drone 2, in contrast to the typical base station, is mobile and hence might radiate close to people. The drone 2 is therefore restricted to a lower maximum allowed output power than the base station 3.

A method for overcoming or at least mitigating this problem is provided. According to an aspect, the method comprises adapting the maximum allowed output power for the drone 2 to its height h over ground. Hence, when the drone is high above ground, and thus far away from people, the maximum allowed output power can be increased, while when the drone 2 is close to ground and hence possibly close to people, the maximum allowed output power is reduced. In this way, the maximum allowed output power for the drones high up in the air (where the coverage is challenging) can be increased which will extend the coverage of drones (and increase uplink bitrates).

Figure 2:
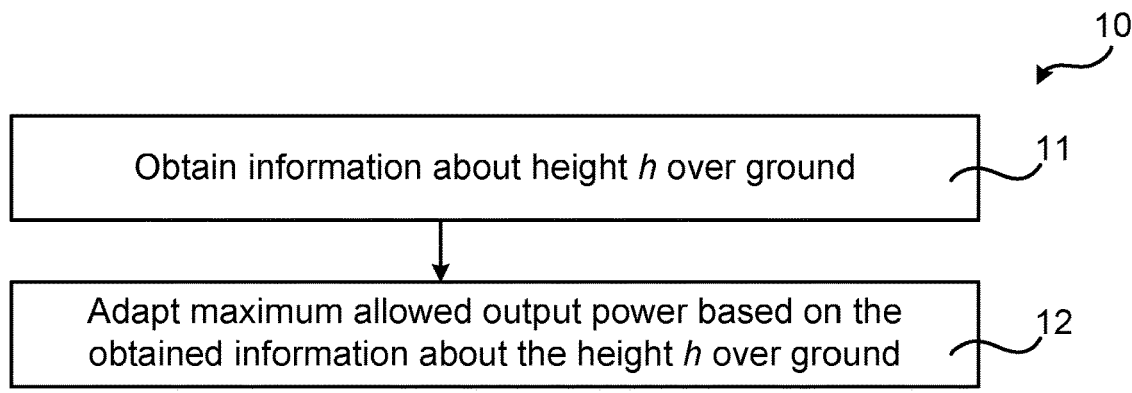
FIG. 2 illustrates a flow chart over steps of an embodiment of a method in an unmanned aerial vehicle in accordance with the present teachings.

FIG. 2 illustrates a flow chart over steps of a method 10 in an unmanned aerial vehicle 2 in accordance with the present teachings.

A method 10 of controlling maximum output power of a transmitter 23 of an unmanned aerial vehicle 2 is provided. The method 10 is performed by the unmanned aerial vehicle 2. The output power of the transmitter 23 may be the Equivalent isotropically radiated power (EIRP) or synonymous Effective Isotropically Radiated Power, which is an IEEE standardized definition of directional radio frequency (RF) power, in terms of the power that would be required to transmit a signal equally in all directions, from a strictly theoretical spherically radiating source.

The method 10 comprises obtaining 11 information about its height h over ground. This may be done in many different manners, e.g. using any height determining device, such as e.g. radar or global navigation satellite system (GNSS) device.

The method 10 comprises adapting 12 maximum allowed output power based on the obtained information about the height h over ground. The unmanned aerial vehicle 2 may, for instance, comprise a memory 21 containing a table with pairs of entries according to:

| Height h | Max. allowed power |
|----------|--------------------|
| h1       | P1                 |
| .        | .                  |
| .        | .                  |
| .        | .                  |
| hn       | Pn                 |

It is noted that such entries may be different for different geographical areas, e.g. different countries may have different EMF regulatory requirements. Therefore, in some embodiments, the unmanned aerial vehicle 2 may be provided with several such tables.

The problem of the output power being too low owing to EMF requirements is overcome by means of the method 10. Irrespective of height, the unmanned aerial vehicle 2 will have a reliable communication link to e.g. a base station, since the EMF requirements are adapted to the height at which the unmanned aerial vehicle flies.

The method 10 may easily be implemented in various types of unmanned aerial vehicles.

In an embodiment, the adapting 12 comprises increasing the maximum allowed output power with increasing height h and reducing the maximum allowed output power with reducing height h. Once the height h is known, the maximum allowed output power for the drone 2 is adjusted based on this height h over ground information: the closer the drone 2 is to the ground (thus closer to people) the lower the maximum output power. Conversely, the higher up the drone 2 flies, the higher the output power can be set. The adjustment can be made automatically and continuously. In other embodiments, the adjustment is made when the height h has changed more than a threshold value.

In various embodiments, the obtaining 11 further comprises obtaining information on its geographical location and wherein the adapting 12 further comprises adapting the maximum allowed output power based on the geographical location. For instance, if the drone 2 determines, based on the geographical location, that it is flying close to an airport it might lower its maximum output power in view of this.

In various embodiments, the adapting 12 further comprises adapting the maximum allowed output power in view of regulations applicable in a region wherein the unmanned aerial vehicle 2 is currently located. In some embodiments, the drone 2 determines in which country it is and then adapts the maximum allowed output power to the particular EMF regulations of that country. For implementing such features, the drone 2 may be provided with information about EMF regulations in different countries. The drone 2 may determine in which country it is by receiving such information from e.g. a base station 3 of the communications network. In other embodiments, the drone 2 is provided with a GPS, which it may use to determine the country. In other embodiments, the drone 2 is provided with a map, e.g. a built in map, which may be used to determine which country the drone 2 currently is in. In still other embodiments, the drone 2 may be manually configured with the applicable regulations. Combinations of all these embodiments are also conceivable, e.g. using both signaling to the communications network and maps.

In various embodiments, the unmanned aerial vehicle 2 is configured with a threshold value and wherein the adapting 12 comprises adapting the maximum allowed output power when the height h has changed more than the threshold value.

In various embodiments, the method 10 comprises obtaining information on height of buildings and wherein the adapting 12 comprises adapting the maximum allowed output power also based on the obtained information on location of buildings having a height above a threshold. In such embodiments, the drone 2 may use a map to detect if there are any high rise buildings in its close vicinity. If there are any such high rise buildings close by, the drone 2 may reduce the maximum allowed output power, thereby reducing risk of using too high power close to people.

In various embodiments, the obtaining 11 the information comprises using one or more of: global navigation satellite system (GNSS) device, one particular example of such GNSS device being a Global Positioning System (GPS) device, a radar, triangulation from network nodes 3, signaling from a communications network 1 and air pressure measurements. The drone 2 may thus obtain the height information in various different ways.

In various embodiments, the method 10 comprises obtaining information on lateral distance to buildings and wherein the adapting 12 comprises adapting the maximum allowed output power also based on the obtained information on lateral distance to buildings. The drone 2 might fly at relatively low heights h and may therefore risk using too high output power close to people if it is flying close to a high rise building.

These embodiments provide advantages such as ensuring that EMF requirements are met irrespective of the lateral and vertical distance of the drone 2 to people.

In various embodiments, a base station 3 is connected to the drone 2 over a wireless link, and the output power of the base station 3 is adapted according to the drone's 2 height h over ground.

Figure 3:
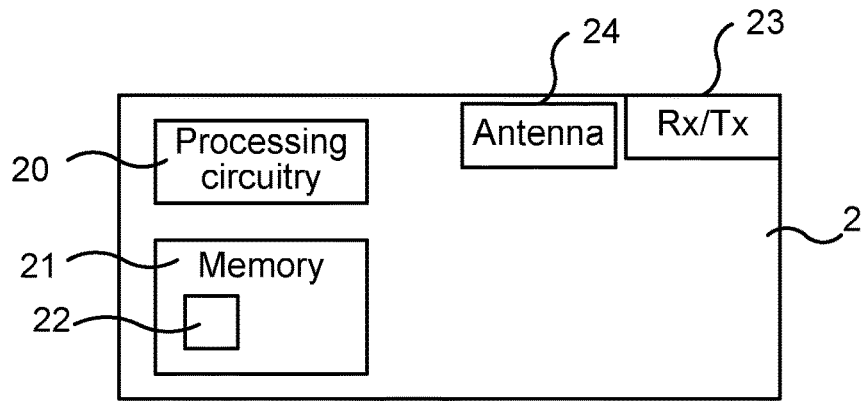
FIG. 3 illustrates schematically an unmanned aerial vehicle and means for implementing embodiments of the method in accordance with the present teachings.

FIG. 3 illustrates schematically an unmanned aerial vehicle and means for implementing embodiments of the method in accordance with the present teachings. The unmanned aerial vehicle 2 comprises processing circuitry 20, which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the unmanned aerial vehicle 2 to perform a set of operations, or steps, e.g. as described in relation to FIG. 2. For example, the storage medium 21 may store the set of operations, and the processing circuitry 20 may be configured to retrieve the set of operations from the storage medium 21 to cause the unmanned aerial vehicle 2 to perform the set of operations. The set of operations may be provided as a set of executable instructions. The processing circuitry 20 is thereby arranged to execute methods as disclosed herein. The storage medium 21 may also comprise persistent storage, which, for example, can be any single one or combination of magnetic memory, optical memory, solid state memory or even remotely mounted memory.

The unmanned aerial vehicle 2 also comprises an input/output means 23 (denoted Tx/Rx) for communicating wirelessly and/or in a wired manned with other entities and devices. The input/output means 23 may, for instance, comprise a protocol stack, for communication with a network node 3 in a wireless manner. The input/output means 23 may be used for receiving data input and for outputting data, e.g. receiving and/or sending information. The unmanned aerial vehicle 2 may comprise receiving circuitry and transmitting circuitry 23. The unmanned aerial vehicle 2 may also comprise or be connected to an antenna device 24, e.g. microwave antenna, for wireless communication with the network node 3 over a wireless link.

An unmanned aerial vehicle 2 is provided for controlling maximum output power of a transmitter 23 thereof. The unmanned aerial vehicle 2 is configured to:

obtain information about its height h over ground, and
adapt maximum allowed output power based on the obtained information about the height h over ground.

The unmanned aerial vehicle 2 may be configured to perform the above steps, and implement any of the described embodiments of the method 10, e.g. by comprising one or more processors 20 (or processing circuitry) and memory 21, the memory 21 containing instructions executable by the processor 20, whereby unmanned aerial vehicle 2 is operative to perform the steps.

In an embodiment thus, an unmanned aerial vehicle 2 of controlling maximum output power is provided. The unmanned aerial vehicle 2 comprises one or more processors 20 and memory 21, the memory 21 containing instructions executable by the processor 20, whereby the unmanned aerial vehicle 2 is operative to: obtain information about its height h over ground, and adapt maximum allowed output power based on the obtained information about the height h over ground.

In an embodiment, the unmanned aerial vehicle 2 is configured to adapt by increasing the maximum allowed output power with increasing height h and reducing the maximum allowed output power with reducing height h.

In various embodiments, the unmanned aerial vehicle 2 is configured to obtain information on its geographical location and to adapt the maximum allowed output power also based on the geographical location.

In various embodiments, the unmanned aerial vehicle 2 is configured to adapt the maximum allowed output power also in view of regulations applicable in a region wherein the unmanned aerial vehicle 2 is currently located.

In various embodiments, the unmanned aerial vehicle 2 is configured with a threshold value and to adapt the maximum allowed output power when the height h has changed more than the threshold value.

In various embodiments, the unmanned aerial vehicle 2 is configured to obtain information on height of buildings and to adapt the maximum allowed output power also based on the obtained information on location of buildings having a height above a threshold.

In various embodiments, the unmanned aerial vehicle 2 is configured to obtain the information by using one or more of: global navigation satellite system (GNSS) device (e.g. a Global Positioning System (GPS) device), a radar, triangulation from network nodes 3, signaling from a communications network 1 and air pressure measurements.

In various embodiments, the unmanned aerial vehicle 2 is configured to obtain information on lateral distance to buildings and to adapt the maximum allowed output power also based on the obtained information on lateral distance to buildings.

Figure 4:
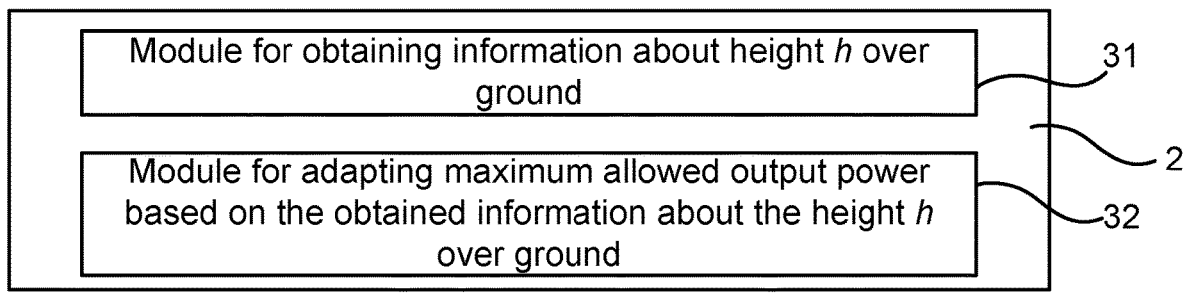
FIG. 4 illustrates an unmanned aerial vehicle comprising function modules/software modules for implementing embodiments of the present teachings.

FIG. 4 illustrates an unmanned aerial vehicle 2 comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

An unmanned aerial vehicle is provided for controlling maximum output power of a transmitter 23 thereof. The unmanned aerial vehicle comprises a first module 31 for obtaining information about height h over ground. The first module 31 may, for instance, comprise processing circuitry adapted to receive the height h from a GNSS device (e.g. a GPS device) arranged in the unmanned aerial vehicle. In other embodiments, the first module 31 may comprises processing circuitry adapted to receive the height h from a radar arranged in the unmanned aerial vehicle.

The unmanned aerial vehicle comprises a second module 32 for adapting maximum allowed output power based on the obtained information about the height h over ground. The second module 32 may, for instance, comprises processing circuitry adapted to adapt the maximum allowed output power. In some embodiments, the processing circuitry is adapted to fetch, from a memory, a maximum allowed output power by using the height h as input.

It is noted that one or both of the modules 31, 32 may be replaced by units.

Figure 5:
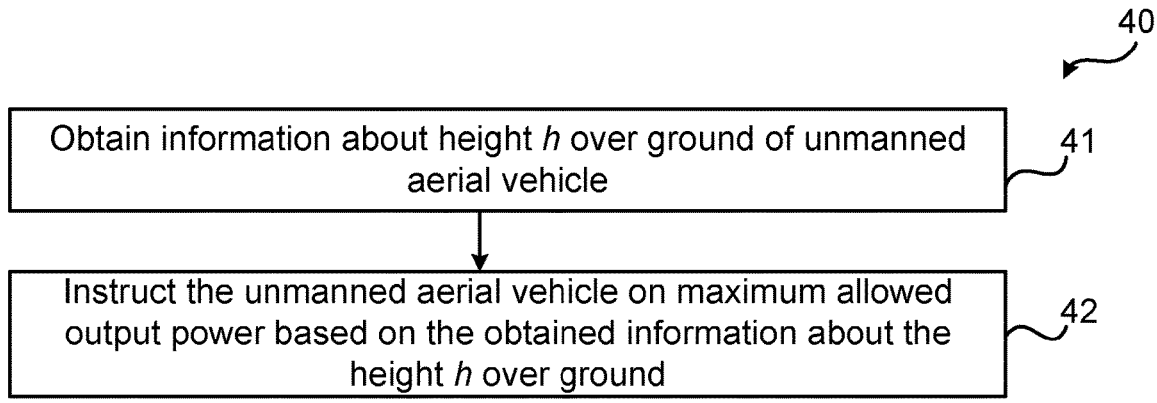
FIG. 5 illustrates a flow chart over steps of an embodiment of a method in a network node in accordance with the present teachings.

FIG. 5 illustrates a flow chart over steps of an embodiment of a method in a network node in accordance with the present teachings.

A method 40 of controlling maximum output power of an unmanned aerial vehicle 2 is provided. The method 30 may be performed by a network node 3 of the communications system 1, e.g. an access node. In other embodiments, the network node 3 may be implemented e.g. as a virtual machine running on a cloud computer. That is, the network node 3 may be an entity of a cloud computing environment, e.g. implemented on a server of Internet. In such embodiments, the network node, e.g. a virtual machine, instructs the unmanned aerial vehicle 2 via an access node that has an wireless link to the unmanned aerial vehicle 2.

The method 40 comprises obtaining 41 information about height h over ground of the unmanned aerial vehicle 2.

The method 40 comprises instructing 42 the unmanned aerial vehicle 2 on maximum allowed output power based on the obtained information about the height h over ground.

A method 40 of controlling maximum output power of an unmanned aerial vehicle 2 is provided. The method 40 is performed by a network node 3 and comprises:

obtaining 41 information about height h over ground of the unmanned aerial vehicle 2, and instructing 42 the unmanned aerial vehicle 2 on maximum allowed output power based on the obtained information about the height h over ground.

In an embodiment, the instructing 42 comprises increasing the maximum allowed output power with increasing height h and reducing the maximum allowed output power with reducing height h.

In various embodiments, the obtaining 41 further comprises obtaining information on geographical location of the unmanned aerial vehicle 2 and the instructing 42 further comprises instructing on the maximum allowed output power based on the geographical location.

In various embodiments, the instructing 42 further comprises instructing the maximum allowed output power in view of regulations applicable in a region wherein the unmanned aerial vehicle 2 is currently located.

In various embodiments, the method 40 comprises obtaining information on location of high buildings and the instructing 42 comprises instructing the maximum allowed output power also based on the obtained information on high buildings.

Figure 6:
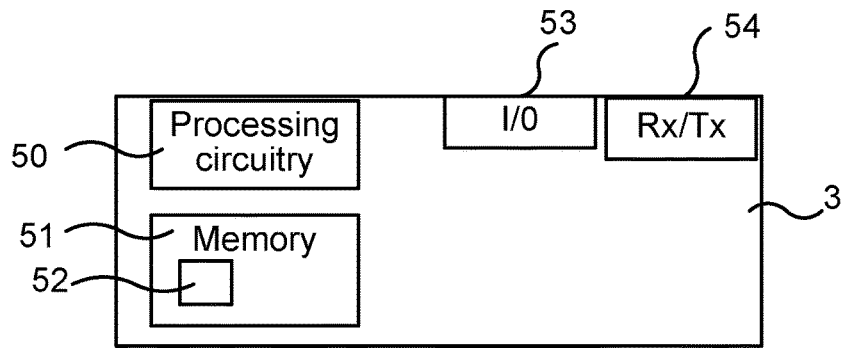
FIG. 6 illustrates schematically a network node and means for implementing embodiments of the method in accordance with the present teachings.

FIG. 6 illustrates schematically a network node and means for implementing embodiments of the method in accordance with the present teachings. The network node 3 comprises processing circuitry 50, which may be any combination of one or more of a suitable central processing unit (CPU), multiprocessor, microcontroller, digital signal processor (DSP), etc., capable of executing software instructions stored in a computer program product 51, e.g. in the form of a storage medium 51. The processing circuitry 50 may further be provided as at least one application specific integrated circuit (ASIC), or field programmable gate array (FPGA).

The processing circuitry 50 is configured to cause the network node 3 to perform a set of operations, or steps, e.g. as described in relation to FIG. 5. For example, the storage medium 51 may store the set of operations, and the processing circuitry 50 may be configured to retrieve the set of operations from the storage medium 51 to cause the network node 3 to perform the set of operations. The set of operations may be provided as a set of executable instructions. The processing circuitry 50 is thereby arranged to execute methods as disclosed herein.

The storage medium 51 may also comprise persistent storage, which, for example, can be any single one or combination of magnetic memory, optical memory, solid state memory or even remotely mounted memory.

The network node 3 also comprises an input/output means 53 for communicating wirelessly and/or in a wired manned with other entities and devices. The input/output means 53 may, for instance, comprise a protocol stack, for communication with the unmanned aerial vehicle 2 in a wireless manner, i.e. over a wireless link. The input/output means 53 may be used for receiving data input and for outputting data, e.g. receiving and/or sending information. The network node 3 may comprise receiving circuitry and transmitting circuitry 54 for the wireless communication. The network node 3 may also comprise or be connected to an antenna device, e.g. microwave antenna, for wireless communication with wireless devices over a wireless link.

It is noted that the network node 3 may be an entity of a cloud computing environment, e.g. implemented on a server of Internet.

A network node 3 for controlling maximum output power of an unmanned aerial vehicle 2 is provided. The network node 3 is configured to obtain information about height h over ground of the unmanned aerial vehicle 2.

The network node 3 is configured to instruct the unmanned aerial vehicle 2 on maximum allowed output power based on the obtained information about the height h over ground.

The network node 3 may be configured to perform the above steps, and implement any of the described embodiments of the method 10, e.g. by comprising one or more processors 50 (or processing circuitry) and memory 51, the memory 51 containing instructions executable by the processor 50, whereby the network node 3 is operative to perform the steps.

In an embodiment thus, a network node 3 for controlling maximum output power of an unmanned aerial vehicle 2 is provided. The network node 3 comprises one or more processors 50 and memory 51, the memory 51 containing instructions executable by the processor 50, whereby the network node is operative to: obtain information about height h over ground of the unmanned aerial vehicle, and instruct the unmanned aerial vehicle 2 on maximum allowed output power based on the obtained information about the height h over ground.

In an embodiment, the network node 3 is configured to instruct by increasing the maximum allowed output power with increasing height h and reducing the maximum allowed output power with reducing height h.

In various embodiments, the network node 3 is configured to obtain information on geographical location of the unmanned aerial vehicle 2 and to instruct on the maximum allowed output power also based on the geographical location.

In various embodiments, the network node 3 is configured to instruct on the maximum allowed output power also in view of regulations applicable in a region wherein the unmanned aerial vehicle 2 is currently located.

In various embodiments, the network node 3 is configured to obtain information on location of high buildings and to instruct on the maximum allowed output power also based on the obtained information on high buildings.

Figure 7:
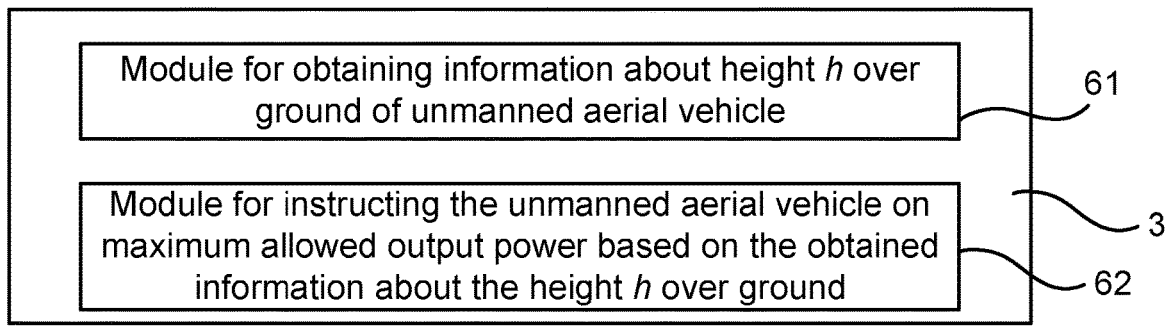
FIG. 7 illustrates a network node comprising function modules/software modules for implementing embodiments of the present teachings.

FIG. 7 illustrates a network node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 40 that has been described in various embodiments.

A network node 3 is provided for controlling maximum output power of a transmitter 23 of an unmanned aerial vehicle. The network node comprises a first module 61 for obtaining information about height h over ground of the unmanned aerial vehicle. The first module 61 may, for instance, comprise processing circuitry adapted to receive the height h from a GNSS device arranged in the unmanned aerial vehicle, or receive the height h from the unmanned aerial vehicle. In other embodiments, the first module 61 may comprises processing circuitry adapted to receive the height h from a radar arranged in the unmanned aerial vehicle.

The network node comprises a second module 62 for instructing the unmanned aerial vehicle on maximum allowed output power based on the obtained information about the height h over ground. The second module 62 may, for instance, comprise processing circuitry adapted to instruct the unmanned aerial vehicle on the maximum allowed output power. In some embodiments, the processing circuitry is adapted to fetch, from a memory, a maximum allowed output power by using the height h as input.

It is noted that one or both of the modules 61, 62 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for controlling maximum output power of a transmitter of an unmanned aerial vehicle (UAV), the method being performed by the unmanned aerial vehicle and comprising:
    obtaining height information about the height (h) of the UAV over the ground;
    obtaining distance information specifying a lateral distance between the UAV and a building; and
    adapting a maximum allowed output power based on the obtained height information about the height of the UAV over the ground and the obtained distance information specifying a lateral distance between the UAV and a building.

2. The method of claim 1, wherein the adapting comprises increasing the maximum allowed output power with increasing height h and reducing the maximum allowed output power with reducing height h.

3. The method of claim 1, wherein the obtaining further comprises obtaining information on the UAV's geographical location and wherein the adapting further comprises adapting the maximum allowed output power based on the geographical location.

4. The method of claim 1, wherein the adapting further comprises adapting the maximum allowed output power in view of regulations applicable in a region wherein the unmanned aerial vehicle is currently located.

5. The method of claim 1, wherein the unmanned aerial vehicle is configured with a threshold value and wherein the adapting comprises adapting the maximum allowed output power when the height h has changed more than the threshold value.

6. The method of claim 1, comprising obtaining information on locations of buildings having a height above a threshold and wherein the adapting comprises adapting the maximum allowed output power also based on the obtained information on locations of buildings having a height above a threshold.

7. A computer program product comprising a non-transitory computer readable medium storing a computer program for an unmanned aerial vehicle, the computer program comprising computer program code, which, when run on processing circuitry of the unmanned aerial vehicle causes the unmanned aerial vehicle to perform the method of claim 1.

8. The method of claim 1, wherein adapting the maximum allowed output power based on the obtained information about the height comprises:
determining that the obtained information about the height of the UAV over the ground indicates that the height of the UAV over the ground has increased; and increasing the maximum allowed output power as a result of determining that the height of the UAV over the ground has increased, or
determining that the obtained information about the height of the UAV over the ground indicates that the height of the UAV over the ground has decreased; and decreasing the maximum allowed output power as a result of determining that the height of the UAV over the ground has decreased.

9. The method of claim 1, wherein adapting the maximum allowed output power based on the obtained information about the height comprises:
determining that the obtained information about the height of the UAV over the ground indicates that the height of the UAV over the ground has increased by at least a threshold amount; and increasing the maximum allowed output power as a result of determining that the height of the UAV over the ground has increased by at least the threshold amount, or
determining that the obtained information about the height of the UAV over the ground indicates that the height of the UAV over the ground has decreased by at least the threshold amount; and decreasing the maximum allowed output power as a result of determining that the height of the UAV over the ground has decreased by at least the threshold amount.

10. An unmanned aerial vehicle comprising a transmitter, the unmanned aerial vehicle being configured to:
obtain height information about the UAV's height h over ground;
obtain distance information specifying a lateral distance between the UAV and a building; and
adapt a maximum allowed output power of the transmitter based on the obtained height information about the height h over ground and the obtained distance information specifying a lateral distance between the UAV and a building.

11. The unmanned aerial vehicle of claim 10, configured to adapt by increasing the maximum allowed output power with increasing height h and reducing the maximum allowed output power with reducing height h.

12. The unmanned aerial vehicle of claim 10, configured to obtain information on the UAV's geographical location and to adapt the maximum allowed output power also based on the geographical location.

13. The unmanned aerial vehicle of claim 10, wherein the unmanned aerial vehicle is configured with a threshold value and to adapt the maximum allowed output power when the height h has changed more than the threshold value.

14. The unmanned aerial vehicle of claim 10, configured to obtain information on height of buildings and to adapt the maximum allowed output power also based on the obtained information on location of buildings having a height above a threshold.

15. A method for controlling maximum output power of an unmanned aerial vehicle, the method being performed by a network node and comprising:
obtaining height information about height h over ground of the unmanned aerial vehicle;
obtaining distance information specifying a lateral distance between the UAV and a building; and
based on the obtained height information about the height h over ground and the obtained distance information specifying a lateral distance between the UAV and a building, setting a maximum allowed output power for the unmanned aerial vehicle.

16. The method of claim 15, wherein the setting comprises increasing the maximum allowed output power with increasing height h and reducing the maximum allowed output power with reducing height h.

17. The method of claim 15, wherein the obtaining further comprises obtaining information on geographical location of the unmanned aerial vehicle and wherein the instructing further comprises instructing on the maximum allowed output power based on the geographical location.

18. The method of claim 15 comprising obtaining information on locations of buildings having a height above a threshold and wherein the setting comprises setting the maximum allowed output power also based on the obtained information on locations of buildings having a height above a threshold.

19. A computer program product comprising a non-transitory computer readable medium storing a computer program for network node, the computer program comprising computer program code, which, when run on processing circuitry of the network node causes the network node to perform the method of claim 15.

20. A network node for controlling maximum output power of an unmanned aerial vehicle, the network node being configured to:
obtain information about height h over ground of the unmanned aerial vehicle;
obtain distance information specifying a lateral distance between the UAV and a building; and
instruct the unmanned aerial vehicle on maximum allowed output power based on the obtained height information about the height h over ground and the obtained distance information specifying a lateral distance between the UAV and a building.

* * * * *